(12) United States Patent
Macaulay (10) Patent No.: US 12,091,339 B1
(45) Date of Patent: Sep. 17, 2024

(54) SUBMERSIBLE MIXING SYSTEMS FOR WASTEWATER TREATMENT

(71) Applicant: THE MASTRRR COMPANY, Webster, TX (US)

(72) Inventor: David Macaulay, Webster, TX (US)

(73) Assignee: The Mastrrr Company, Webster, TX (US)

( * ) Notice: Subject to any disclaimer, the term of this patent is extended or adjusted under 35 U.S.C. 154(b) by 0 days.

(21) Appl. No.: 18/651,991

(22) Filed: May 1, 2024

Related U.S. Application Data (60) Provisional application No. 63/463,444, filed on May 2, 2023.

(51) Int. Cl.
*C02F 1/72* (2023.01)

(52) U.S. Cl.
CPC ........ *C02F 1/722* (2013.01); *C02F 2301/024* (2013.01); *C02F 2303/04* (2013.01)

(58) Field of Classification Search
CPC ...... C02F 1/72; C02F 1/32; C02F 1/46; C02F 1/74; C02F 1/70; C02F 1/44; C02F 1/42; B01F 23/43; B01F 27/111; B01F 27/25
See application file for complete search history.

(56) References Cited

U.S. PATENT DOCUMENTS

| | | | |
|---|---|---|---|
| 4,076,617 A | 2/1978 | Bybel et al. | |
| 4,086,057 A | 4/1978 | Everett | |
| 7,762,715 B2 | 7/2010 | Gordon et al. | |
| 2010/0207285 A1* | 8/2010 | Tanaka | B01F 27/25 261/84 |

FOREIGN PATENT DOCUMENTS

CN 204735153 U * 11/2015

OTHER PUBLICATIONS

CN-204735153-U-Translation (Year: 2015).*
United States Environmental Protection Agency, "Alternative Disinfection Methods Fact Sheet: Peracetic Acid", Sep. 2012, 5 pages.
VigorOx WWT II, "Mechanisms of Peracetic Acid Inactivation of Microbes", Disinfection Forum No. 16, Feb. 2017, 2 pages.
VigorOx WWT II, "Assessment of Peracetic Acid Disinfection Performance in Wastewater", Disinfection Forum No. 13, May 2016, 5 pages.
Lenntech, "Disinfectants Peracetic acid", Retrieved from https://www.lenntech.com/processes/disinfection/chemical/disinfectants-peracetic-acid.htm, 2 pages.
Canvitation Technologies, Inc., "Cavigulation Water Treatment Technology", Aug. 22, 2013, 3 pages.
Gibson, et al., "A Literature Review of Ultrasound Technology and Its Application in Wastewater Disinfection", Water Quality Research Journal, Feb. 2008, DOI: 10.2166/wqrj.2008.004, 14 pages.

(Continued)

*Primary Examiner* — Walter D. Griffin
*Assistant Examiner* — Cameron J Allen
(74) *Attorney, Agent, or Firm* — Patterson + Sheridan, LLP (57) ABSTRACT

A submersible mixing system configured to allow a liquid chemical to be induced directly into the periphery of a radial pattern hydrodynamic cavitation zone, and then dispersed into a water stream, channel, chamber, or rapid mix box with superior velocity gradient mixing intensity to treat wastewater.

20 Claims, 6 Drawing Sheets

(56) References Cited

OTHER PUBLICATIONS

Blume, et al., "Improved wastewater disinfection by ultrasonic pre-treatment", Ultrasonics Sonochemistry, vol. 11, Issue 5, 2004, DOI: 10.1016/S1350-4177(03)00156-1, 8 pages.

Neis, et al., "Ultrasonic Disinfection of Wastewater Effluents for High-Quality Reuse", Water Supply, vol. 3, Issue 4, Aug. 2003, https://doi.org/10.2166/ws.2003.0071, 8 pages.

Plummer, et al., "Inactivation of *E. coli* and MS2 coliphage with Ultrasound and Chlorine", American Water Works Association—Water Quality Technology Conference, 2002, 8 pages.

* cited by examiner

SUBMERSIBLE MIXING SYSTEMS FOR WASTEWATER TREATMENT

CROSS-REFERENCE TO RELATED APPLICATION

This application claims the benefit of U.S. Provisional Patent Application No. 63/463,444, filed May 2, 2023, which is incorporated by reference herein in its entirety.

BACKGROUND

Field

Embodiments of the present disclosure relate to submersible mixing systems configured to allow a liquid chemical (e.g. peracetic acid) to be induced directly into the periphery of a radial pattern hydrodynamic cavitation zone, and then dispersed into a water stream, channel, chamber, or rapid mix box with superior velocity gradient mixing intensity to treat wastewater.

Description of the Related Art

Wastewater such as municipal sewage or industrial effluent contains many inorganic, organic, and harmful microbiological materials, most of which are only partially degraded by conventional waste treatments. Such conventional waste systems and methods are inefficient for certain applications and have only been capable of treating small portions of contaminants normally found in domestic or industrial wastewater.

Therefore, there is a need for new and/or improved submersible mixing systems for treating wastewater.

SUMMARY

In one embodiment, a submersible mixing system comprises a motor disposed within a motor housing; a mixer coupled to the motor housing, wherein the mixer comprises an outer mixer housing, an inner mixer body disposed within the outer mixer housing, and one or more injection nozzles; a feed port configured to supply a liquid chemical to the injection nozzles of the mixer; and a distributor at least partially disposed in the mixer, wherein the distributor is rotatable by the motor, and wherein the distributor comprises an end face having one or more parabolic shaped vacuum cavities configured to create a hydrodynamic cavitation vacuum upon rotation of the distributor in a body of water.

In one embodiment, a wastewater treatment system comprises a submersible mixing system; and a guide rail assembly comprising a pair of guide rails and a support bracket, wherein the submersible mixing system is coupled to the support bracket, and wherein the support bracket is movable along the guide rails to move the submersible mixing system.

In one embodiment, a method of wastewater treatment comprises submersing a submersible mixing system into a body of wastewater; supplying a liquid chemical to the feed port via a supply line; rotating the distributor in the body of wastewater thereby creating a hydrodynamic cavitation vacuum and forming a radial cavitation discharge; injecting the liquid chemical from the injection nozzles into the radial cavitation discharge to disperse the liquid chemical in the body of wastewater; and treating the body of wastewater via a combination of the radial cavitation discharge and the liquid chemical to remove inorganic, organic, and/or harmful microbiological materials from the wastewater.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to submersible mixing systems for treating wastewater. Domestic and/or industrial wastewater is treated to remove inorganic, organic, and/or harmful microbiological materials such as bacteria. The submersible mixing systems use a combination of hydrodynamic cavitation and liquid chemicals, such as peracetic acid, to disinfect wastewater.

Figure 1:
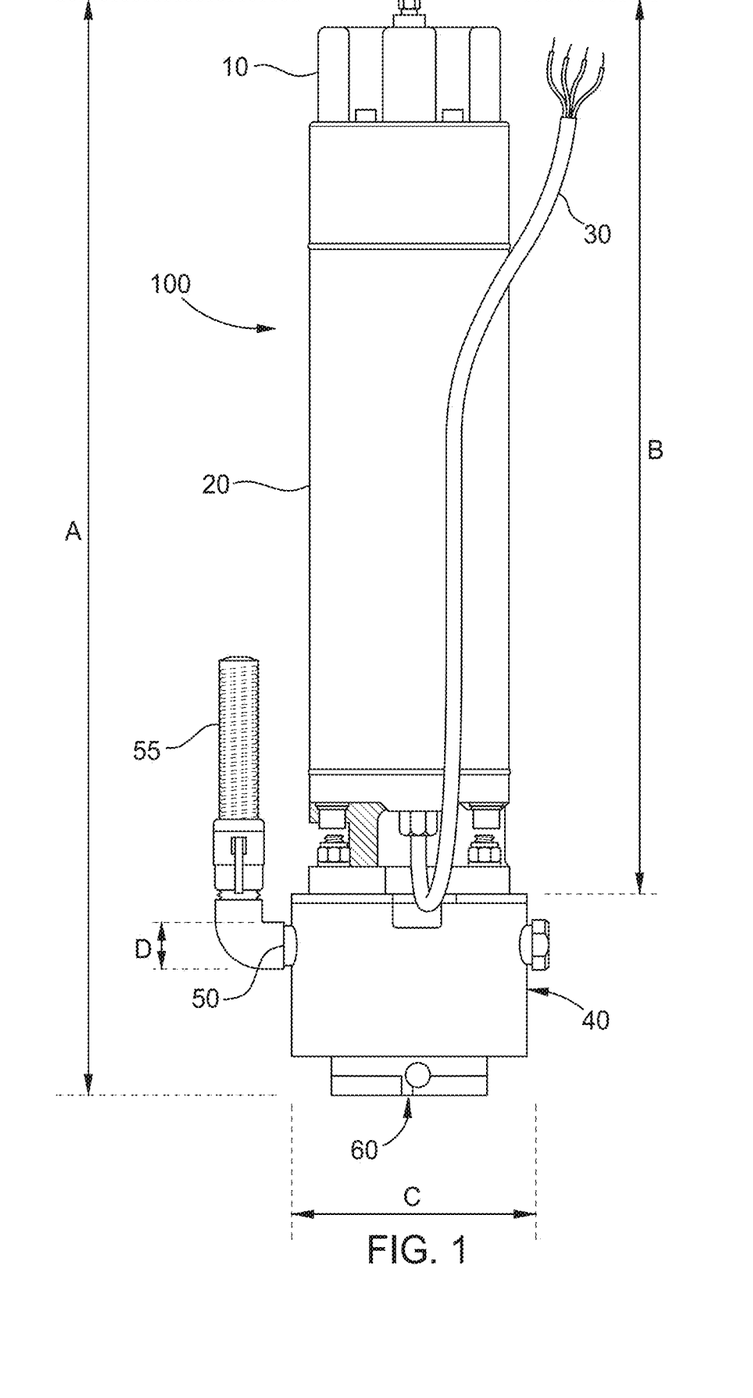
FIG. 1 is a side view of a submersible mixing system, according to one embodiment.

FIG. 1 is a side view of a submersible mixing system 100, according to one embodiment. The system 100 comprises a motor 10, a motor housing 20, a motor power cord 30, a mixer 40, a feed port 50, and a distributor 60. The motor housing 20 may enclose portions of or the entire motor 10, as well as other components. The mixer 40 is coupled to one end of the motor housing 20. The feed port 50 may be formed through a sidewall of the mixer 40. The distributor 60 is at least partially disposed within the mixer 40. The distributor 60 is coupled to the motor housing 20 and/or the mixer 40 such that the distributor 60 is rotatable relative to the motor housing 20 and the mixer 40. The motor 10 is coupled to the distributor 60, such as by a drive shaft, and is configured to rotate the distributor 60 during operation of the system 100 as further described below.

A length "A" of the system 100 may be within a range of 20 inches to 40 inches. A length "B" of the motor 10 and the motor housing 20 may be within a range of 20 inches to 35 inches. A diameter "C" of the system 100 may be within a range of 6 inches to 9 inches. A diameter "D" of the feed port 50 may be within a range of 1 inch to 2 inches. The motor power cord 30 may be an 8 gauge or 10 gauge power cord to supply power to the motor 10. The motor 10 may have a power within a range of 5 horsepower to 25 horsepower. The motor 10 may be oil filled and water cooled.

Figure 2:
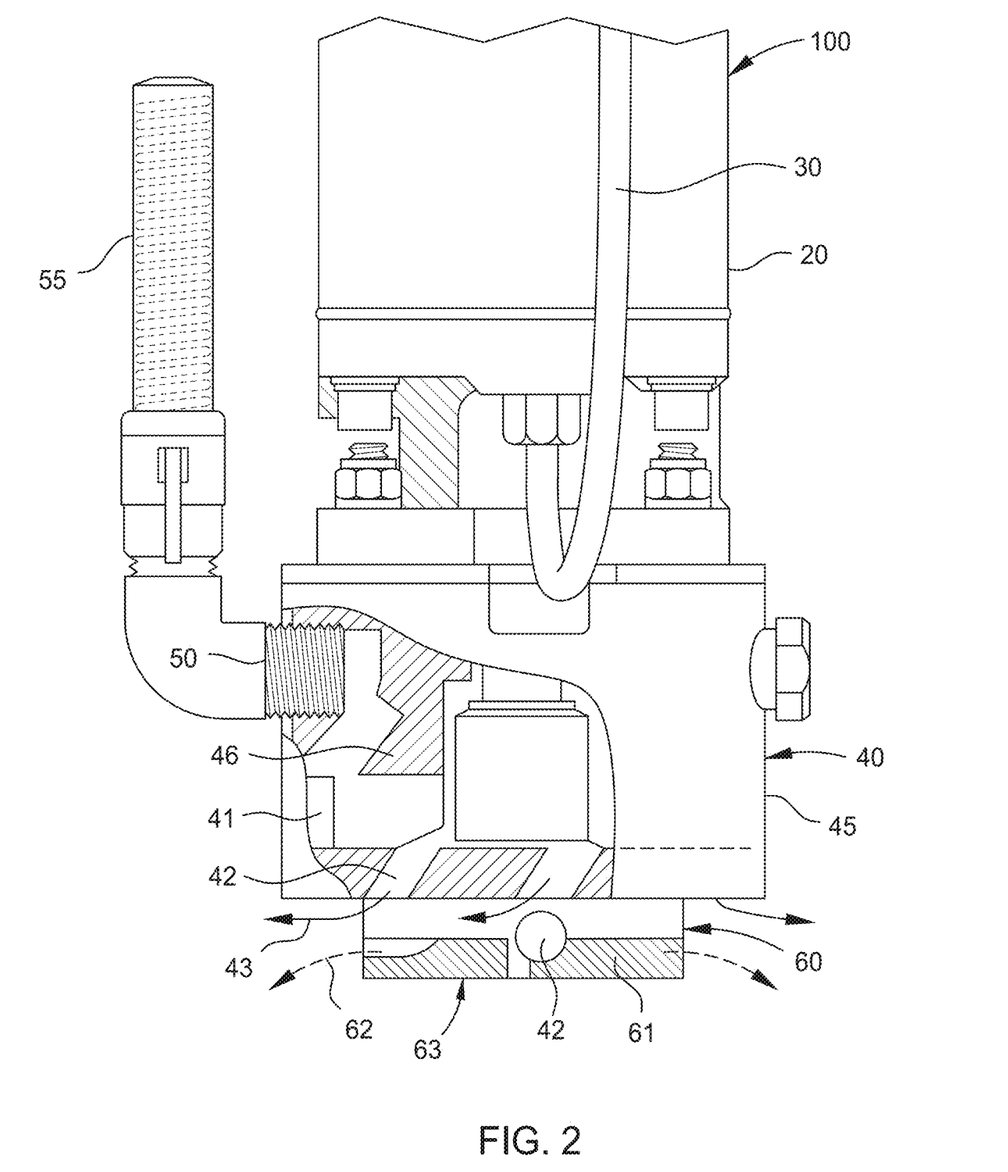
FIG. 2 is a partial sectional view of a portion of the submersible mixing system, according to one embodiment.
Figure 3A:
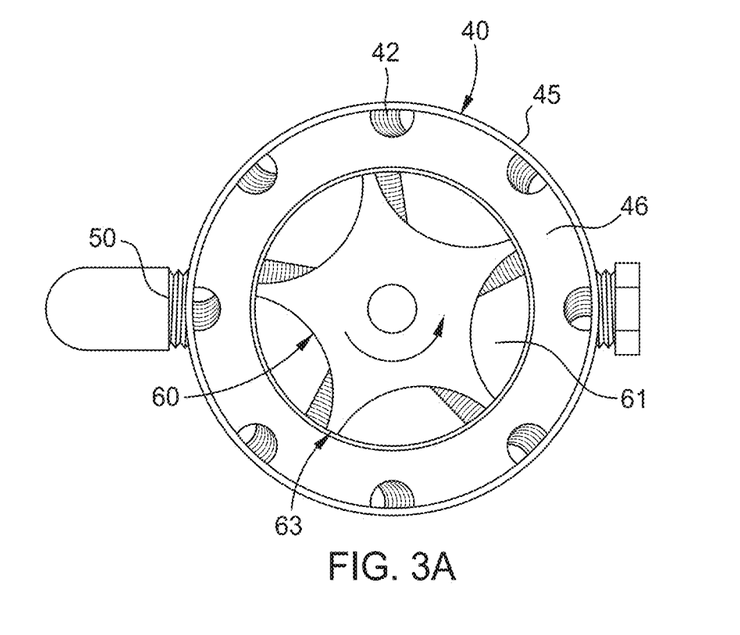
FIG. 3A is a bottom view of the submersible mixing system, according to one embodiment.
Figure 3B:
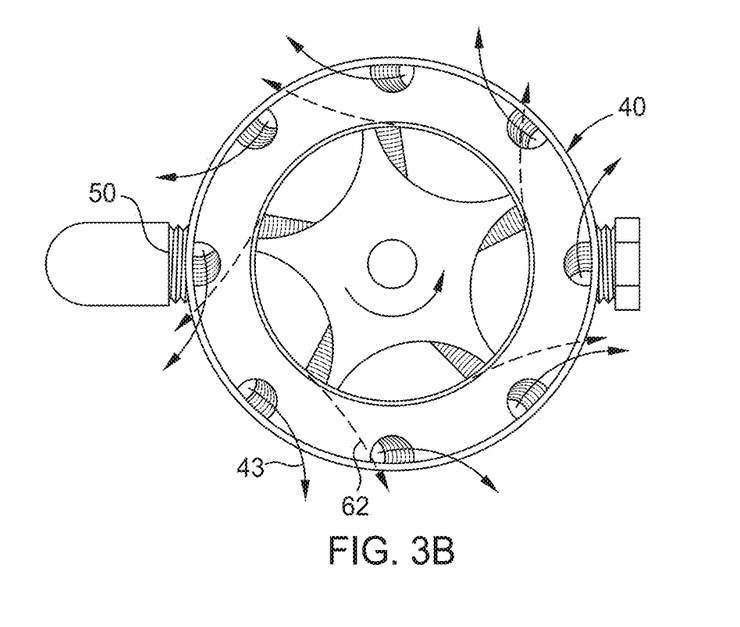
FIG. 3B is a bottom view of the submersible mixing system in operation, according to one embodiment.
Figure 4:
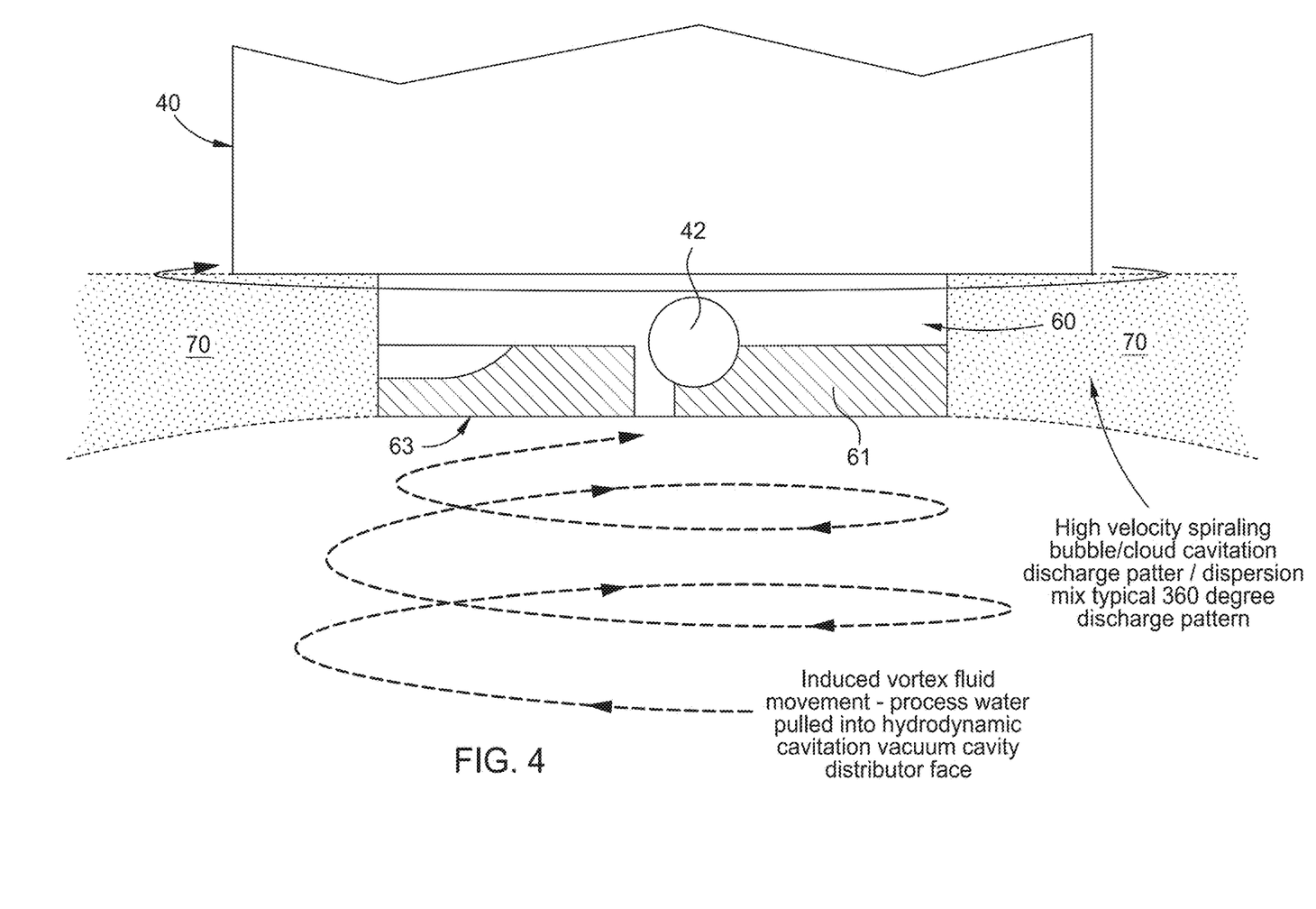
FIG. 4 is an enlarged view of a portion of the submersible mixing system, according to one embodiment.

FIG. 2 is a partial sectional view of a portion of the submersible mixing system 100, according to one embodiment. FIG. 3A is a bottom view of the submersible mixing system 100, according to one embodiment. FIG. 3B is a bottom view of the submersible mixing sub 100 in operation, according to one embodiment. FIG. 4 is an enlarged view of a portion of the submersible mixing system 100, according to one embodiment.

With reference to FIGS. 2, 3A, 3B, and 4, the feed port 50 of the system 100 is a non-vacuum style feed port for liquid chemical induction. A supply line 55 is coupled to the feed port 50 and supplies the liquid chemical 43 to the mixer 40. The mixer 40 comprises an outer mixer housing 45 and an inner mixer body 46, each of which may be in the form of hollow cylindrical bodies. The feed port 50 is formed through the outer mixer housing 45 and is in fluid communication with one or more fluid paths 41 formed in and/or about the inner mixer body 46. The fluid paths 41 are in fluid communication with one or more injection nozzles 42 also formed in and/or about the inner mixer body 46. The injection nozzles 42 may be formed at an end of the inner mixer body 46 and at least partially formed by the outer mixer housing 45. Although eight injection nozzles 42 are illustrated in FIG. 3A, the mixer 40 may comprise any number of injection nozzles 42.

The liquid chemical 43 used to disinfect the wastewater may be peracetic acid, which is a strong oxidant and virucide. Peracetic acid may cause direct oxidation/destruction of microorganism cell walls with leakage of cellular constituents outside of the cell. When peracetic acid decomposes in water, the free radicals hydrogen peroxyl (HO2) and hydroxyl (OH) that are formed have efficient oxidizing capacity and can play an active role in the disinfection process. The microorganisms, e.g. bacteria, are destroyed because of protoplasmic oxidation resulting in cell wall disintegration. The effectiveness of disinfection depends on the susceptibility of the target organisms, the contact time, and the concentration of the peracetic acid.

The distributor 60 is at least partially disposed within the inner mixer body 46 but extends below the inner mixer body 46 and the outer mixer housing 45. The distributor 60 is rotatable relative to the inner mixer body 46 and the outer missing housing 45 by the motor 10. The distributor 60 is in the form of a cylindrical body having an end face 63. The end face 63 of the distributor 60 comprise one or more parabolic shaped vacuum cavities 61. Although five parabolic shaped vacuum cavities 61 are illustrated in FIG. 3A, the distributor 60 may comprise any number of parabolic shaped vacuum cavities 61. Due to the shape and arrangement of the parabolic shaped vacuum cavities 61, a hydrodynamic cavitation vacuum is created upon rotation of the distributor 60 in a body of water.

Hydrodynamic cavitation is the formation and dissolution of vapor-filled voids (e.g. vapor bubbles) in liquid mediums. Because the distributor 60 rotates through the water at a high number of rotations per minute, a pressure side and a suction side are created on each of the parabolic shaped vacuum cavities 61. The faster the parabolic shaped vacuum cavities 61 cut through the water, the lower the pressure becomes on the suction side of the parabolic shaped vacuum cavities 61. At a certain speed, the pressure on the suction side is so low that the water flowing over that area evaporates, forming vapor bubbles or voids. This happens because at "normal" air pressure of 1,013.25 hecto Pascals (hPa), water evaporates at 100 degrees Celsius. At a higher pressure, the evaporation temperature is higher, and respectively lower at a lower pressure. Thus, in this case, water starts boiling and evaporates at a pressure of 23.37 hPa at a temperature of 20 degrees Celsius.

When the local pressure decreases below the vapor pressure, water evaporates, a cavitation bubble forms, grows larger and gets transported with the flow to a region with a higher pressure. At this point the bubble stops growing and when the local pressure exceeds the vapor pressure, vapor condenses starting from the wall of the bubble. Eventually, the surface of the bubble starts to break down in its weakest spot and the bubble implodes. During this implosion, the water flows back into the space to fill the collapsed void whereby pressure surges arise that can have orders of magnitude of several hundred mega Pascal (MPa). This process creates pressure waves with high pressure peaks.

These pressure waves cause the formation of hydrogen atoms and hydroxyl radicals. The combined impact of fluid shear, tensile stresses, and hydroxyl radicals may cause inactivation of microorganisms. In addition, cavitation bubble collapse may break up floc material, making microorganisms more susceptible to disinfection, or may disrupt cell membranes, causing an increased sensitivity to liquid chemical disinfectants, such as peracetic acid, thereby allowing more or quicker cell membrane destruction.

As described above, the pressure side and the suction side formed within each parabolic shaped vacuum cavity 61 induces a vortex fluid movement that pulls wastewater into the hydrodynamic cavitation vacuum. The wastewater is dispersed radially in the form of a high velocity, spiraling bubble/cloud cavitation discharge illustrated by reference arrows 62. The bubble/cloud cavitation discharge 62 may have a 360 degree discharge pattern. The combination of liquid chemical disinfection and hydrodynamic cavitation disinfection results in a quicker and more efficient wastewater treatment process.

Figure 5:
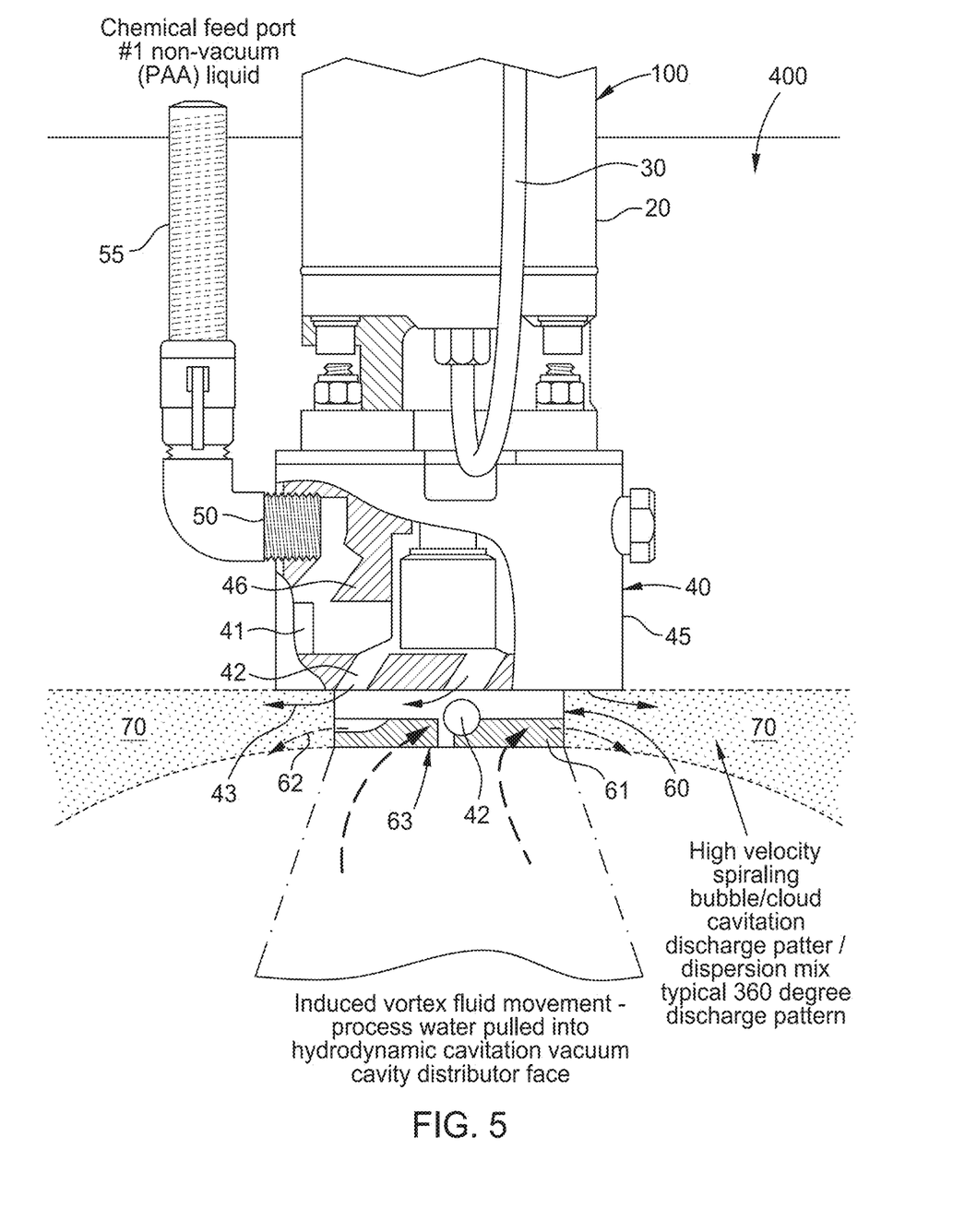
FIG. 5 is another partial sectional view of a portion of the submersible mixing system in a body of water, according to one embodiment.

FIG. 5 is another partial sectional view of a portion of the submersible mixing system 100 in a body of water 400, such as wastewater, according to one embodiment. The system 100 allows the liquid chemical 43, such as peracetic acid, to be induced directly into the periphery of a radial pattern hydrodynamic cavitation zone 70 and then dispersed into the body of water 400 with superior velocity gradient mixing intensity. The feed port 50 provides a low shear mix of the liquid chemical 43 through the one or more fluid paths 41 to the one or more injection nozzles 42 such that it is dispersed around the rotating hydrodynamic cavitation vacuum distributor 60 and is swept away with radial bubble/cloud cavitation discharge 62 flow. Specifically, the injection nozzles 42 inject the liquid chemical 43 out of the mixer 40 at a location just above and next to the outer circumference of the end face 63 of the rotating hydrodynamic cavitation vacuum distributor 60.

The injection nozzles 42 are oriented at an angle relative to the longitudinal axis of the system 100. The injection nozzles 42 may be oriented at an angle such that the liquid chemical 43 is injected in the same direction that the distributor 60 is rotating. The injection nozzles 42 may be oriented at an angle such that the liquid chemical 43 is injected in the opposite direction that the distributor 60 is rotating. The mixer 40 may have injection nozzles 42 oriented at different angles such that the liquid chemical 43 is injected in both the same direction and the opposite direction that the distributor 60 is rotating. The system 100 has a 360 degree unobstructed high rate chemical discharge pattern (illustrated by reference arrows 43) that is radially outward from the system 100. The high rate chemical discharge pattern allows for high velocity gradient mixing intensity and eliminates short circuit potential in wide channel applications.

Figure 6:
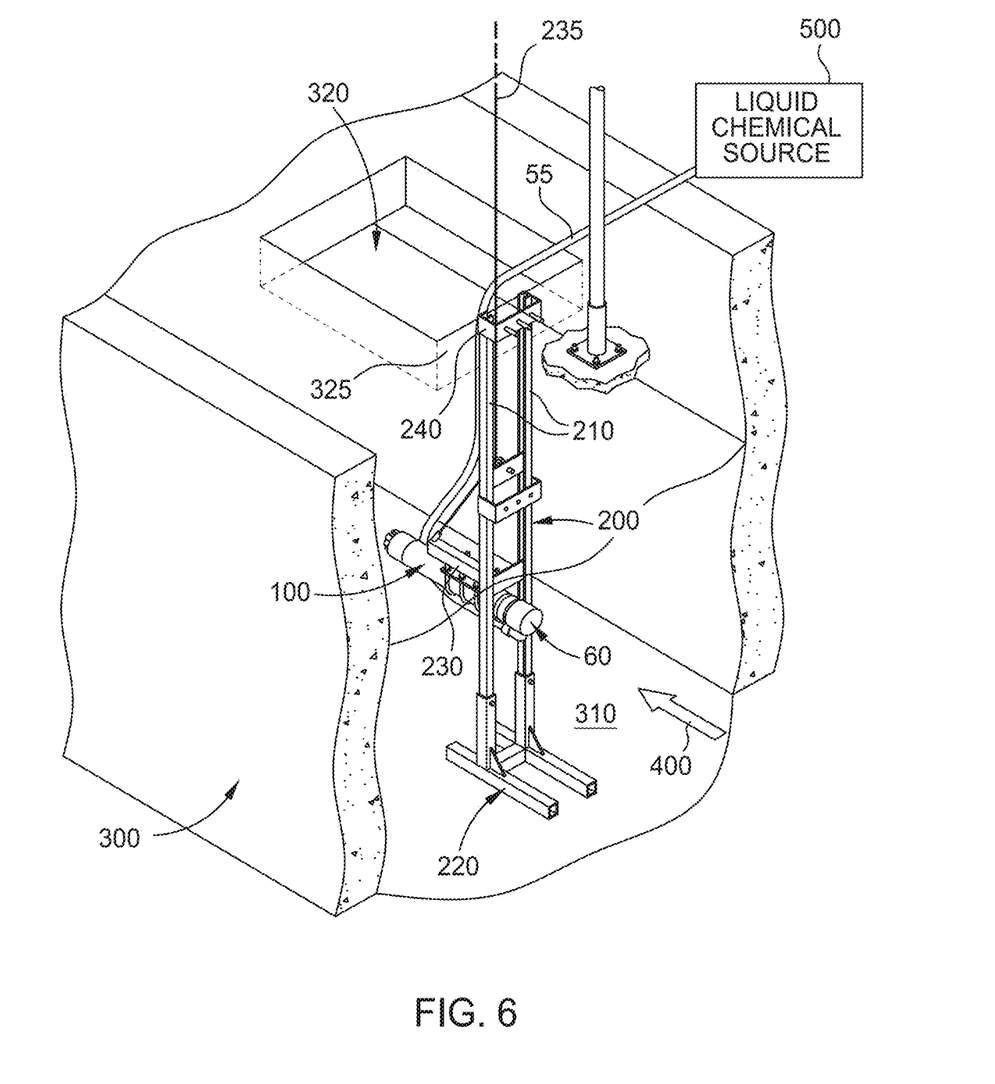
FIG. 6 is a perspective view of the submersible mixing system deployed in a water channel, according to one embodiment.

FIG. 6 is a perspective view of the submersible mixing system 100 deployed in a water channel 300 containing the body of water 400, according to one embodiment. The system 100 is supported by a guide rail assembly 200. The guide rail assembly 200 comprises a pair of guide rails 210, a base support 220, a support bracket 230, and a wall mount 240. The base support 220 is positioned on the floor 310 of the water channel 300 to support the lower end of the guide rails 210. The guide rails 210 are oriented vertically, and the wall mount 240 secures the upper end of the guide rails 210 to a wall 325 formed by an opening 320 into the water channel 300. The system 100 is coupled to the guide rails 210 by the support bracket 230, which can slide up and down along the guide rails 210 to raise and lower the system 100 to the desired location. The support bracket 230 can be raised and lowered by a cable 235 that is connected to a crane or other heavy lifting type of equipment.

Although the system 100 is shown as being oriented horizontally and parallel to the water flow 400, the system 100 can be oriented vertically or at any angle between horizontal and vertical orientations. Specifically, the distributor 60 of the system 100 can be oriented so that it is facing into the water flow 400, facing away from the water flow 400, facing down toward the floor 310 of the water channel 300, facing up toward the opening 320 of the water channel 300, or at any angle relative to the water flow 400 and the water channel 300. During operation, a liquid chemical such as peracetic acid, can be supplied to the system 100 through the supply line 55 from a liquid chemical source 500 located on the surface. In this manner, the system 100, through the combination of hydrodynamic cavitation and liquid chemical induction can more efficiently treat domestic and industrial wastewater.

In one embodiment, a method of wastewater treatment comprises submersing the submersible mixing system 100 into the body of water 400; supplying the liquid chemical 43 to the feed port 50 via the supply line 55; rotating the distributor 60 in the body of water 400 thereby creating a hydrodynamic cavitation vacuum and forming a radial cavitation discharge 70; injecting the liquid chemical 43 from the injection nozzles 42 into the radial cavitation discharge 70 to disperse the liquid chemical 43 in the body of water 400; and treating the body of water 400 via a combination of the radial cavitation discharge 70 and the liquid chemical 43 to remove inorganic, organic, and/or harmful microbiological materials from the body of water 400. The liquid chemical 43 may be peracetic acid. The method may further comprise injecting the liquid chemical 43 from the injection nozzles 42 in a same direction and/or opposite direction that the distributor 60 is rotating. The method may further comprise submersing the submersible mixing system 100 into the body of water 400 via the guide rail assembly 200. The submersible mixing system 100 may be oriented horizontally or vertically when coupled to the guide rail assembly 200.

The present disclosure contemplates that terms such as "couples," "coupling," "couple," and "coupled" may include welding, interference fitting, and/or fastening such as by using adhesives, bolts, threaded connections, and/or screws. The present disclosure contemplates that terms such as "couples," "coupling," "couple," and "coupled" may include direct coupling and/or indirect coupling. The present disclosure contemplates a variety of sizes and/or scaling can be used for the embodiments described herein.

Any of the embodiments recited above may be combined, in whole or part, with any of the other embodiments recited above. It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements.

While the foregoing is directed to embodiments of the present disclosure, other and further embodiments of the disclosure may be devised without departing from the basic scope thereof, and the scope thereof is determined by the claims that follow.

I claim:
1. A submersible mixing system, comprising:
a motor disposed within a motor housing;
a mixer coupled to the motor housing, wherein the mixer comprises an outer mixer housing, an inner mixer body disposed within the outer mixer housing, and one or more injection nozzles;
a feed port configured to supply a liquid chemical to the injection nozzles of the mixer; and
a distributor at least partially disposed in the mixer, wherein the distributor is rotatable by the motor, and wherein the distributor comprises an end face having one or more parabolic shaped vacuum cavities configured to create a hydrodynamic cavitation vacuum upon rotation of the distributor in a body of water.

2. The submersible mixing system of claim 1, wherein the feed port is formed through the outer mixer housing and is in fluid communication with the injection nozzles via one or more fluid paths formed within and/or about the inner mixer body.

3. The submersible mixing system of claim 2, wherein the injection nozzles are formed at an end of the inner mixer body and are at least partially formed by the outer mixer housing.

4. The submersible mixing system of claim 3, wherein the injection nozzles are oriented at an angle relative to a longitudinal axis of the submersible mixing system.

5. The submersible mixing system of claim 4, wherein the injection nozzles are oriented at an angle such that the liquid chemical is injected from the injection nozzles in a same direction that the distributor rotates.

6. The submersible mixing system of claim 4, wherein the injection nozzles are oriented at an angle such that the liquid chemical is injected from the injection nozzles in an opposite direction that the distributor rotates.

7. The submersible mixing system of claim 1, wherein the injection nozzles inject the liquid chemical out of the mixer at a location just above and next to an outer circumference of the end face of the distributor.

8. The submersible mixing system of claim 1, wherein the liquid chemical is peracetic acid.

9. A wastewater treatment system, comprising:
the submersible mixing system of claim 1; and
a guide rail assembly comprising a pair of guide rails and a support bracket, wherein the submersible mixing system is coupled to the support bracket, and wherein the support bracket is movable along the guide rails to move the submersible mixing system.

10. The wastewater treatment system of claim 9, wherein the submersible mixing system is oriented horizontally when coupled to the support bracket.

11. The wastewater treatment of claim 9, wherein the submersible mixing system is oriented vertically when coupled to the support bracket.

12. A method of wastewater treatment, comprising:
submersing the submersible mixing system of claim 1 into a body of wastewater;
supplying a liquid chemical to the feed port via a supply line;
rotating the distributor in the body of wastewater thereby creating a hydrodynamic cavitation vacuum and forming a radial cavitation discharge;
injecting the liquid chemical from the injection nozzles into the radial cavitation discharge to disperse the liquid chemical in the body of wastewater; and
treating the body of wastewater via a combination of the radial cavitation discharge and the liquid chemical to remove inorganic, organic, and/or harmful microbiological materials from the wastewater.

13. The method of wastewater treatment of claim 12, wherein the liquid chemical is peracetic acid.

14. The method of wastewater treatment of claim 12, further comprising injecting the liquid chemical from the injection nozzles in a same direction that the distributor is rotating.

15. The method of wastewater treatment of claim 12, further comprising injecting the liquid chemical from the injection nozzles in an opposite direction that the distributor is rotating.

16. The method of wastewater treatment of claim 12, further comprising submersing the submersible mixing system into the body of wastewater via a guide rail assembly.

17. The method of wastewater treatment of claim 16, wherein the submersible mixing system is oriented horizontally when coupled to the guide rail assembly.

18. The method of wastewater treatment of claim 16, wherein the submersible mixing system is oriented vertically when coupled to the guide rail assembly.

19. The method of wastewater treatment of claim 12, wherein the injection nozzles are oriented at an angle relative to a longitudinal axis of the submersible mixing system.

20. The method of wastewater treatment of claim 17, wherein the end face of the distributor faces toward a flow of the body of wastewater.

* * * * *